United States Patent Office 2,940,077
Patented June 7, 1960

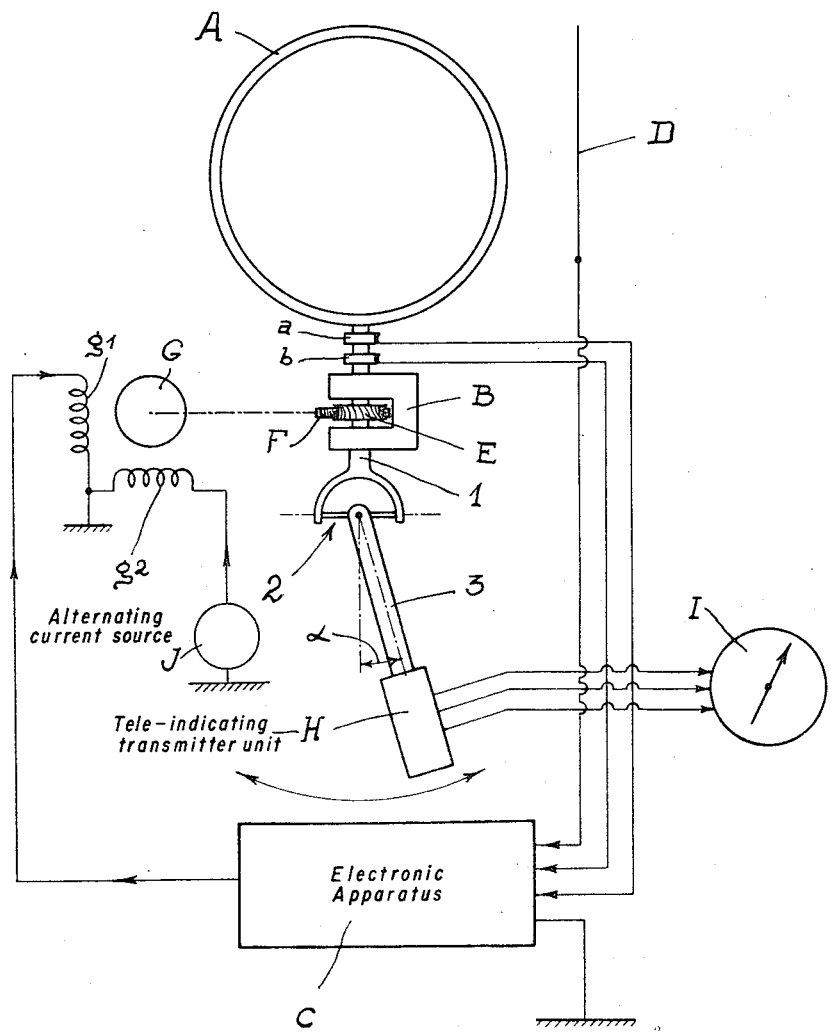

2,940,077
IMPROVEMENTS IN RADIO-COMPASSES

Georges Garnier, Asnieres, France, assignor to Air-Equipment, Asnieres, France, a French company Filed May 31, 1956, Ser. No. 588,502

Claims priority, application France June 8, 1955

2 Claims. (Cl. 343—114)

The present invention relates to radio compasses mounted on aircraft and whose indicator is remote controlled by a tele-indicating device.

It is known that owing to the masses of the aircraft carrying the radio compass, the aerial or frame of the radio compass does not always exactly indicate the direction of the transmitter or radio station, the signals of which are to be picked up by the radio compass.

This direction is subjected to an error known as "quadrantal error" which disappears only in four positions of the loop aerial, namely the two positions corresponding to the case when the longitudinal axis of the aircraft is oriented in the direction of the transmitter and the two positions at 90° to said positions. This quadrantal error is of the form $$\tan \varphi = K \tan \varphi'$$

wherein $\varphi$ is the true bearing angle, that is the angle between a reference axis (generally the longitudinal axis of the aircraft carrying the radio-compass) and the true direction of an emitter; $\varphi'$ is the apparent bearing angle between the said reference axis and the apparent direction of said emitter; K is a constant depending from the aircraft carrying the radio-compass.

The invention is based on the fact that a single Cardan joint satisfies the law $\tan x = \cos \alpha \tan y$, in which $x$ is the angle of rotation effected by one of the shafts of the joint, $y$ is the angle of rotation effected by the other shaft of the joint and $\alpha$ is the angle between these two shafts.

It will be seen that the law of the quadrantal error of a radio-compass carried by an aircraft is similar to the law of a single Cardan joint.

According to the invention, in a radio compass whose indicator is remote controlled by a tele-indicating device, a single Cardan joint is interposed between the spindle of the loop aerial and the movable or control means of the transmitter of the tele-indicating device, one of the shafts of the Cardan joint being in the extension of the spindle of the loop aerial with which it is rigid as concerns rotational movement (or forming part of this spindle), whereas the other shaft of the joint is in the extension of the spindle of the movable means of said transmitter with which it is rigid as concerns rotational movement (or forms part of this spindle).

Adjusting and locking means permit adjusting and maintaining, in a reference plane (for example, the plane of symmetry of an aircraft), the angle between the two shafts of the Cardan joint (so that $\cos \alpha = K$).

Further features and advantages of the invention will be apparent from the ensuing description of an embodiment of a radio compass improved in accordance with the invention, this embodiment being given solely by way of example and shown diagrammatically in the figure of the accompanying drawing.

In this figure, A designates the rotative loop aerial of the radio compass, the spindle 1 of this aerial being journalled in a fixed support B.

The turns of wire of the loop aerial are connected to two slip rings $a$ and $b$ against which are applied current-receiving brushes connected to an electronic apparatus C well known in the radio compass art.

An antenna D which serves to remove doubt in the readings (error of 180°) is also connected to the apparatus C.

Keyed to the spindle 1 is a worm wheel E which is in mesh with a worm F driven by a reversible two-phase electric motor G. The stator winding $g2$ of this motor is permanently fed with alternating current from a local source J (for example, a source of alternating current at 400 c./s.), whereas the stator winding $g1$ is fed with alternating current from the appartus C which leads or lags 90° in phase relative to the current in the winding $g2$ each time the loop aerial A is not in the direction for which there is no voltage at its terminals.

In such a device the loop aerial is driven by the motor G so as to be constantly in the above-mentioned direction (the apparent direction of the radio station).

H designates the tele-indicating transmitter unit connected to the receiver-indicator I placed at a distance therefrom.

As it has been stated above, owing to the masses of the aircraft carrying the radio compass, the aerial or frame A does not always exactly indicate the direction of the transmitter or radio station. This direction is subject to the quadrantal error $\tan \varphi = K \tan \varphi'$ which disappears only in four positions of the loop aerial, namely the two positions corresponding to the case when the longitudinal axis of the aircraft is oriented in the direction of the transmitter and the two positions at 90° to said two positions. Thus, if the movable means of the unit H were mounted directly on the spindle 1 of the loop aerial A, the indicator I would provide readings having a quadrantal error.

This is the reason for interposing between the spindle 1 and the unit H a correcting device so as to eliminate this quadrantal error.

According to the invention, the correcting arrangement comprises a single Cardan joint 2 the input shaft of which is the spindle 1 of the loop aerial A whereas the output shaft 3 is connected to the movable means of the unit H.

It is known that in such a joint the law of motion is $$\tan x = \cos \alpha \tan y$$

where $x$ is the angle of rotation of the shaft 1, $y$ is the angle of rotation of the shaft 3 and $\alpha$ angle between the shafts 1 and 3. It is merely necessary to vary $\alpha$ until $\cos \alpha$ has the value K in the expression $\tan \varphi = K \tan \varphi'$ whereupon the quadrantal error disappears. In a mobile object having an axis of symmetry, such as an aircraft, the angle $\alpha$ is suitated in the plane of symmetry of the aircraft.

Locking means, not shown in the drawing, permit after determining the angle $\alpha$, locking the unit H in the required angular position and the radio compass is finally adjusted (as concerns elimination of the quadrantal error) with respect to the aircraft.

It should be understood that the embodiment of the correcting arrangement described above and shown in the accompanying drawing is given merely by way of example and many modifications and changes may be made therein without departing from the scope of the invention as defined in the appended claims.

What I claim is:

1. In a radio-compass having an orientable receiver loop aerial, a spindle carrying the said aerial and rotatable about its axis for orienting the aerial, and a tele-indicating transmitter device having a driven spindle for remote controlling an indicator, the provision of a single Cardan joint, one shaft of which is positively connected to the spindle of the loop aerial so as to rotate with said spindle, whereas the other shaft of the Cardan joint is positively connected to the driven spindle of the tele-indicating transmitter device so as to rotate with the latter spindle, the two shafts of the Cardan joint being capable of making any adjustable angle therebetween, in order to counterbalance, in the tele-indicating transmitter device, the quadrantal errors of the angular position of the loop aerial.

2. A radio-compass as in claim 1, wherein one shaft of the Cardan joint is in the extension of the spindle of the loop aerial with which it is rigid as concerns rotational movement, whereas the other shaft of the Cardan joint is in the extension of, and rigid with as concern rotational movement, the driven spindle of the tele-indicating transmitter device.

References Cited in the file of this patent

UNITED STATES PATENTS

| | | |
|---|---|---|
| 2,023,891 | Kaess | Dec. 10, 1935 |
| 2,271,564 | Mullner | Feb. 3, 1942 |
| 2,292,722 | Stiegler | Aug. 11, 1942 |
| 2,330,226 | Lear | Sept. 28, 1943 |